(12) United States Patent
Lewis et al.

(10) Patent No.: US 7,333,395 B2
(45) Date of Patent: Feb. 19, 2008

(54) SYSTEM, METHOD AND APPARATUS FOR ATTRACTING AND STIMULATING AQUATIC ANIMALS

(75) Inventors: William Henry Lewis, Alexandria, LA (US); Stuart Randall Flint, Shreveport, LA (US)

(73) Assignee: Bioxonix Systems, L.L.C., Alexandria, LA (US)

( * ) Notice: Subject to any disclaimer, the term of this patent is extended or adjusted under 35 U.S.C. 154(b) by 0 days.

(21) Appl. No.: 11/419,327

(22) Filed: May 19, 2006

(65) Prior Publication Data

US 2006/0268664 A1    Nov. 30, 2006

Related U.S. Application Data

(63) Continuation of application No. 10/616,402, filed on Jul. 9, 2003, now abandoned.

(51) Int. Cl.
*H04B 1/02* (2006.01)
(52) U.S. Cl. .......................... 367/139; 43/17.1
(58) Field of Classification Search ........... 367/139, 367/153, 174; 43/17.1; 116/22 A
See application file for complete search history.

(56) References Cited

U.S. PATENT DOCUMENTS

| | | | | |
|---|---|---|---|---|
| 4,922,468 | A | * | 5/1990 | Menezes ................. 367/139 |
| 5,046,278 | A | * | 9/1991 | Szilagyi et al. .......... 43/17.1 |
| 5,177,891 | A | | 1/1993 | Holt |
| 5,282,178 | A | | 1/1994 | Hill et al. |
| 5,883,858 | A | | 3/1999 | Holt |

* cited by examiner

*Primary Examiner*—Ian J. Lobo
(74) *Attorney, Agent, or Firm*—McGarry Bair PC

(57) ABSTRACT

A programmable, customizable system, method, and apparatus for attracting and stimulating aquatic animals are disclosed. The present invention provides for the underwater playback of digitally prerecorded "signature" sounds of prey, and of prey being attacked and eaten, in order to attract fish and other species and stimulate them to strike and feed more aggressively. Playback is achieved by selecting any of a plurality of signature sound recordings stored on a memory device which is located and controlled above water. One sound, all sounds, or a selected sequence of sounds may be selected from the memory device to be played underwater. Underwater playback is achieved by use of a submersible transducer device which may function as both a speaker and a hydrophone. Underwater playback may be customized and controlled above water by providing a number of customized operational modes. For example, a user may select a sound recording to be repeatedly played in a loop, with each iteration separated by a delay period, the length of which is selected by the user. In addition, the user may select a plurality of different sound recordings, and specify the sequence and volume at which they are played underwater, as well as a delay period between each recording. The user may also select all sound recordings to be played at a selected volume level, and the user may further specify a delay period between each recording. Furthermore, the user may select sound recordings to be played underwater at varying volume levels according to selections made by the user.

59 Claims, 8 Drawing Sheets

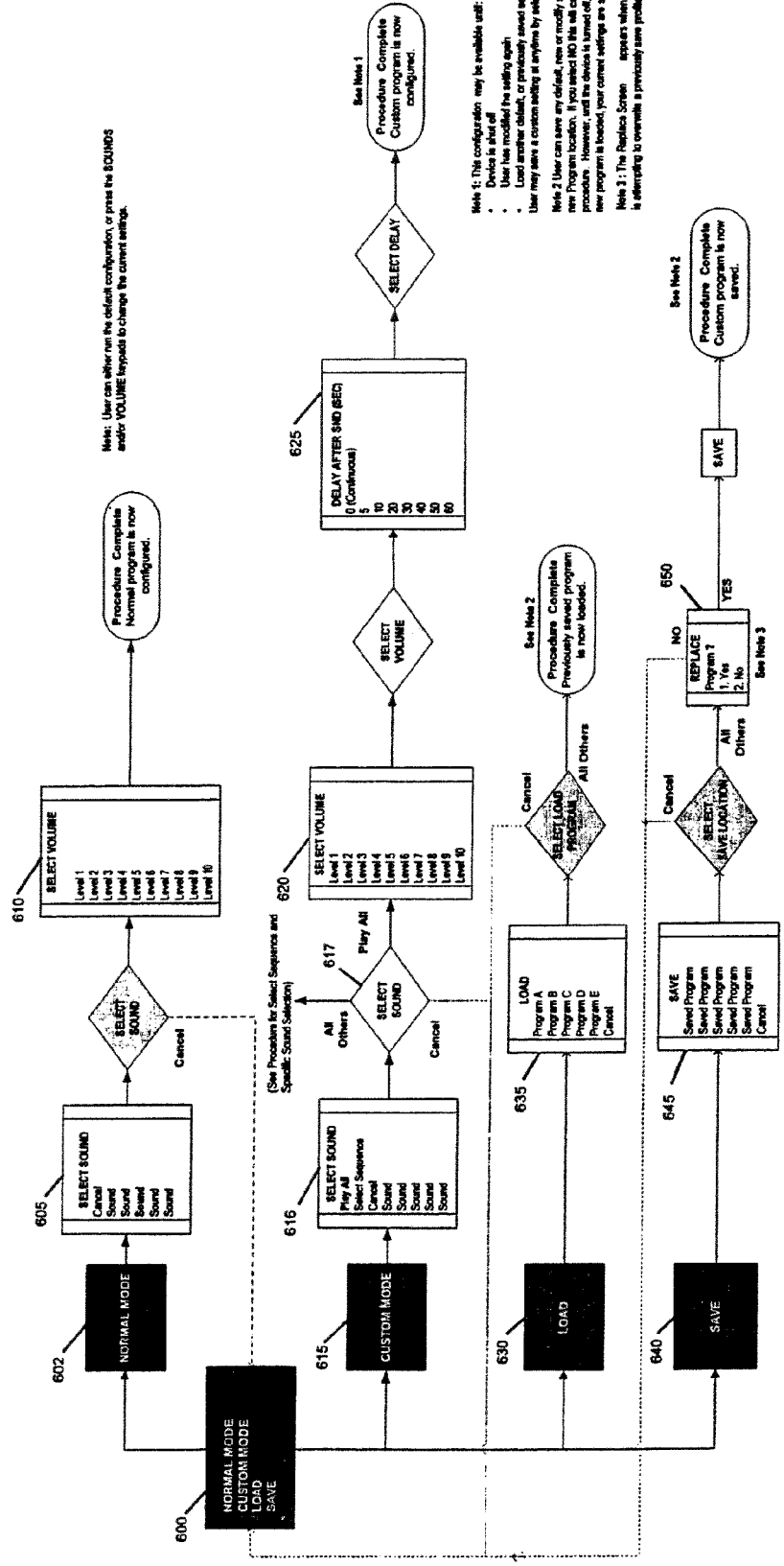
FIG. 6 Normal, Play All, Load and Save Procedures

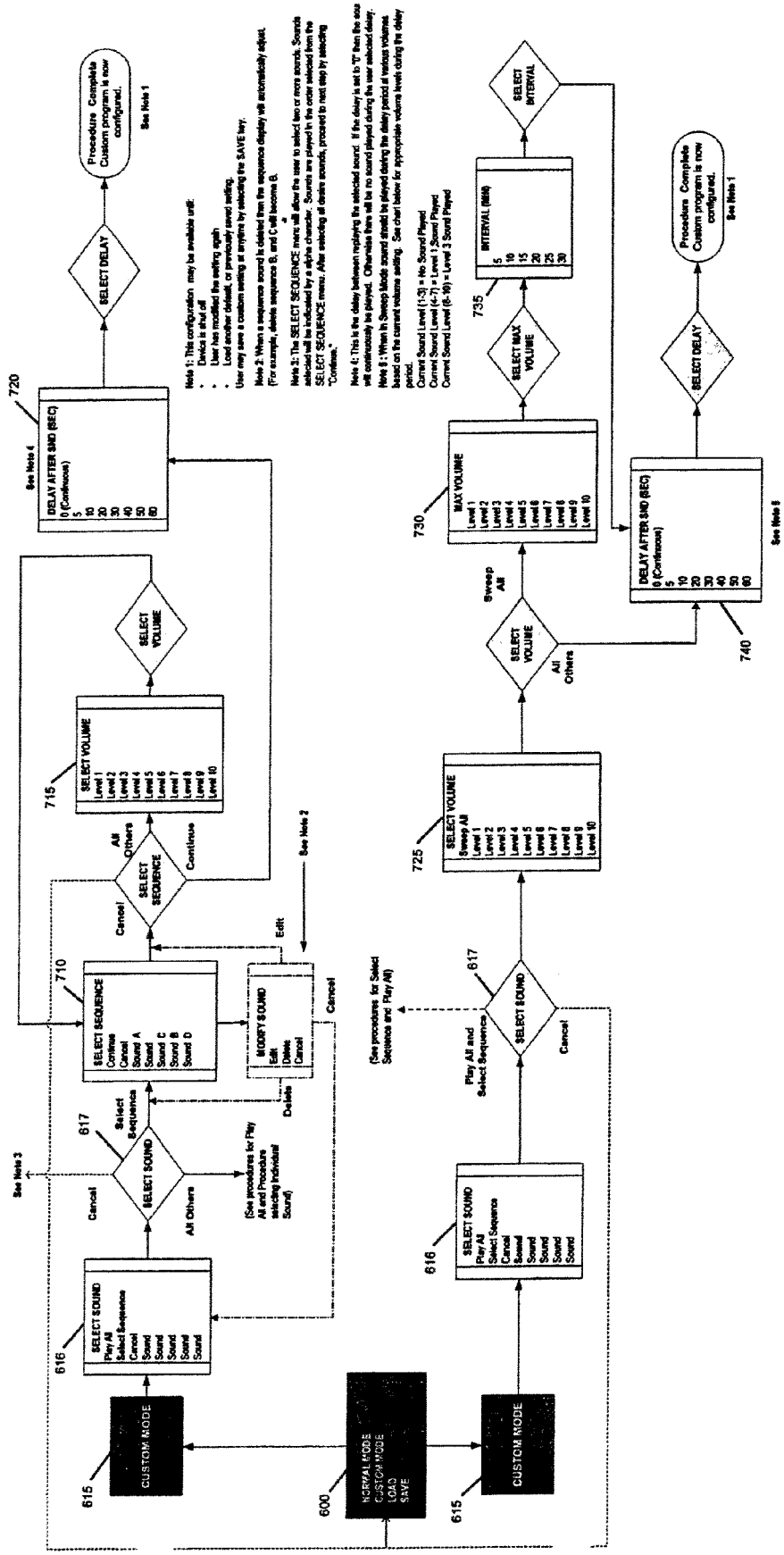
FIG. 7 Select Sequence & Selecting One Sound Procedures

SYSTEM, METHOD AND APPARATUS FOR ATTRACTING AND STIMULATING AQUATIC ANIMALS

CROSS-REFERENCE TO RELATED APPLICATION

The present application is a continuation of application Ser. No. 10/616,402 filed on Jul. 9, 2003 now abandoned and entitled "System, Method, and Apparatus for Attracting and Stimulating Aquatic Animals," the contents of which are hereby incorporated by reference. The benefit of priority under 35 U.S.C. § 120 is hereby claimed.

FIELD OF THE INVENTION

The present invention relates generally to attracting animals underwater, and more particularly, to a dynamic, programmable, and customizable system, method, and apparatus for attracting and stimulating aquatic animals using sound recordings.

BACKGROUND OF THE INVENTION

Sound is an important source of information to fish and other aquatic animals about their environment, because sound is transmitted through water very efficiently. Water is known to be an excellent conductor of sound waves because it is much denser than air, and its molecules are closer together. In addition, sound travels several times faster in water than in air. Moreover, sound travels farther in water than in air. The attenuation of sound over distance in water is much less than the attenuation of light.

In addition to sound waves, acoustical effects occur in water as follows: As one draws closer to a sound source, and the frequency of that sound gets lower, there is an actual outward movement of water that is generated along with the sound waves. This is analogous to sitting close to a speaker and feeling a faint burst of air when a low bass note is struck. In water, this movement of water is called the "near-field effect," while standard sound waves (i.e., audible sounds) are known as the "far-field effect." Fish sense near-field vibrations through their lateral lines, while detecting far-field sound waves with their inner ears, and these waves travel long distances in water.

While fish and other species may use all their senses to locate food, sounds and vibrations are key trigger mechanisms in the biological genetic response to attack prey, particularly those sounds and vibrations produced by schooling baitfish and distressed prey. Furthermore, sound is often of significant value in aquatic environmental conditions unsuitable for visual or olfactory chemical communication. For example, the effectiveness of visual stimuli in an underwater location can be limited by low light levels and/or turbidity (e.g., muddy water) or the like which severely attenuate the intensity of the light over distance. Chemical signals involving the olfactory sense of the fish propagate slowly, are non-directional and are easily diffused by water currents.

Fishermen have attempted to reproduce underwater sounds in order to attract fish and other species by means of lures that produce a sound or vibration. A number of rattling or vibrating lures have been produced which attempt to attract fish by electrically or mechanically generating and transmitting signals which simulate acoustics produced by baitfish. However, fish generally appear to produce acoustic signals which vary in signal frequency, periodicity and amplitude. Such complex signals are not readily reproduced by simple buzzers or other devices which generate signals of fixed frequency, duration and amplitude or which are varied in an arbitrary manner.

Further attempts have been made which involve using a frequency synthesizer to generate signals of varying frequency and broadcasting them underwater in order to influence the behavior of aquatic animals. In addition, underwater acoustical signals produced by actual species of aquatic animals have been recorded. For example, members of a particular species of baitfish may be isolated in a tank or other isolated environment, and signals produced underwater have been recorded by means of an underwater acoustical transducer. A hydrophone has also been used to record the sounds of one or more bass fish actually striking and consuming baitfish, such as a minnow or shad, and reproducing the recorded sounds underwater at a location where it is desired to attract bass.

SUMMARY OF THE INVENTION

A need has arisen for a system, method, and apparatus for attracting and stimulating aquatic animals that improves upon the prior art. A dynamic system, method, and apparatus for attracting and stimulating aquatic animals that is programmable and customizable from above water would be a desirable in a wide variety of applications. The present invention provides for dynamically programmable, customizable playback underwater of digitally prerecorded "signature" sounds of prey, and of prey being attacked and eaten, in order to attract fish and other species and stimulate them to strike and feed more aggressively. Playback is achieved via a plurality of signature sound recordings stored on a memory device which is located and controlled above water. One sound, all sounds, or a customized sequence of sounds may be selected from the memory device to be played underwater. Underwater playback is achieved by use of a submersible transducer device which may function as both a speaker and a hydrophone. The submersible device may be depth and volume adjustable, and may also be omni-directional.

In accordance with the present invention, playback may be customized and controlled above water by providing a number of customized operational modes. For example, a user may select a sound recording to be repeatedly played in a loop, with each iteration separated by a delay period, the length of which is selected by the user. This may be accomplished by simply pressing the appropriate keys on a programmable unit above water, or otherwise providing instructions via an input device above water. In addition, the user may select a plurality of different sound recordings, and specify the sequence and volume at which they are played underwater, as well as a delay period between each recording. The user may also select all sound recordings to be played at a selected volume level, and the user may further specify a delay period between each recording. Such delay is advantageously provided in order to more effectively attract various aquatic species and furthermore maintain the attraction.

Furthermore, the user may select sound recordings to be played underwater at varying volume levels according to selections made by the user. While the sound recordings are played underwater, the user can simultaneously listen to them above water. The system of the present invention is programmable to automatically playback one or more sounds beginning from lowest to highest volume levels, from highest to lowest volume levels, from a specific volume level to another specific volume level higher or lower, or playback sounds at various volume levels/settings in any specific order or sequence that the user selects. Such various modes of operating volume levels may alternately be organized or preset by factory or the user into specific volume playback categories which may be programmed and saved within the system or onto a pluggable memory module for spontaneous selection, thereby reducing need and time of user in programming multiple sound volume levels.

All or any sound volume level configuration or programming options can be applied to any specific sound or any combination of sounds in permanent data storage (built-in non-volatile) or from portable memory module/sound card, or both simultaneously.

The above preset or programmable operations for configuring custom settings for volume level and sound selections are equally operable for configuring custom playback delays or playback intermittency as defined previously. Any number of delay intermittency settings are programmable by user to automatically function in any sequential order or as applied to any specific sound or sounds within a sound sequencing operation described above. The same or similar advantages as per sound selection sweeps and sound volume sweeps are provided with this delay intermittency sweep operation, and actually improves overall effectiveness of system under the combined effects of all above programming of sweeps for volume, sound selections, intermittency in addition to other system advantages.

The present invention also provides several unique advantages over the prior art relating to systems, methods, and devices for improved attraction and stimulation. In addition to the speaker/hydrophone capability, the submersible transducer device provided by the present invention may further include additional functionality including but not limited to sonar detection, GPS, temperature gauge, water clarity/turbidity meter, oxygen meter, pH meter, and trolling speed indicator. The submersible transducer device may further include diving planes, rudders, and flotation devices that would allow for depth control, orientation and attitude while trolling. The submersible transducer unit may further be coupled to or integrated with a video camera for visually monitoring the underwater environment, and a light source and intensity meter that can be programmed for intensity changes to automatically trigger the playback of a particular sound, for example, a sound shown to be more effective during night-time fishing.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 6 depicts a process flow diagram of modes of operation of a system for attraction and stimulation in accordance with one embodiment of the present invention.

FIG. 7 depicts a process flow diagram of additional modes of operation of a system for attraction and stimulation in accordance with one embodiment of the present invention.

DETAILED DESCRIPTION OF THE INVENTION

Figure 1:
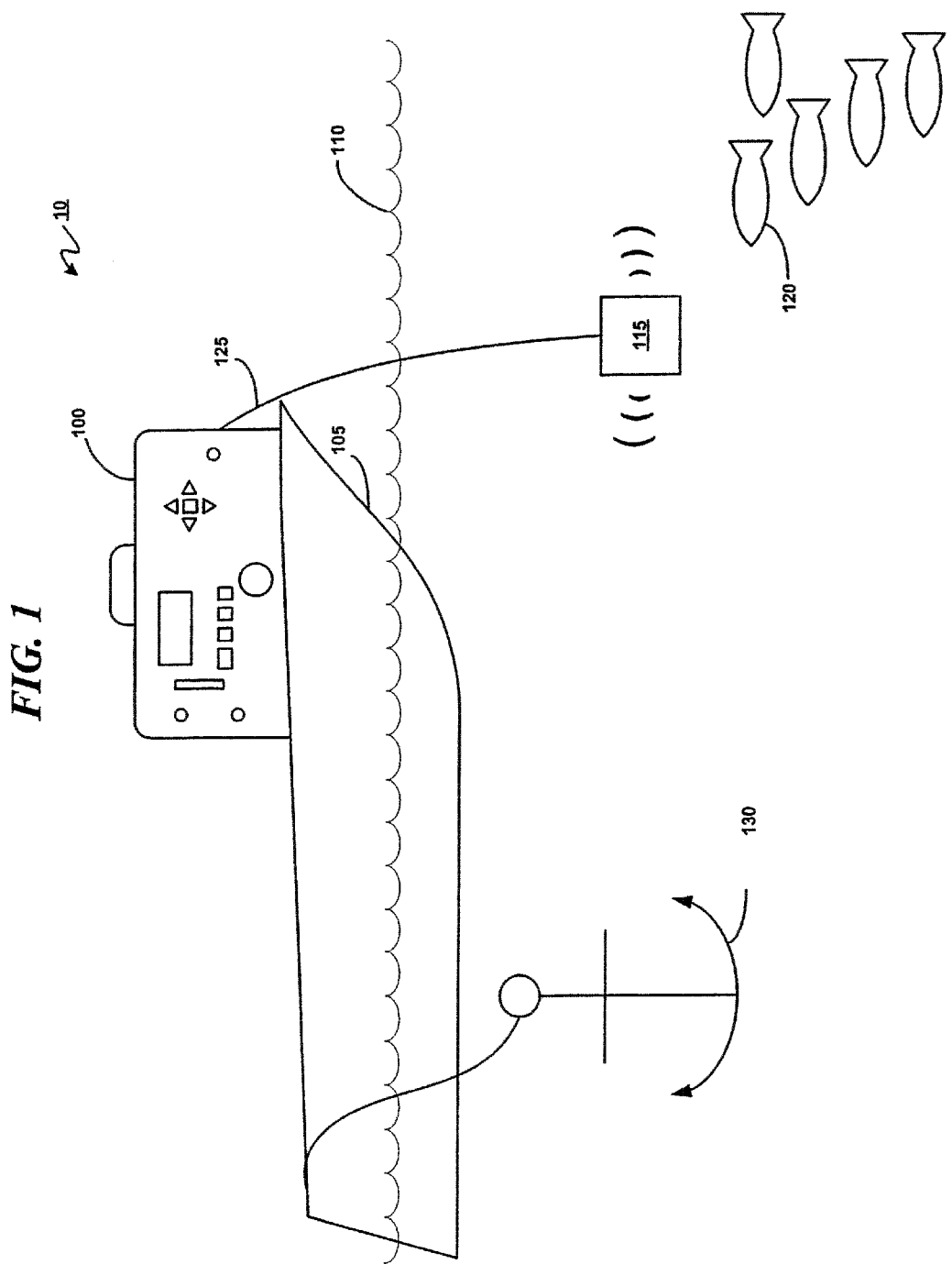
FIG. 1 depicts a simplified elevational view of an attraction and stimulation system in accordance with one embodiment of the present invention.

Reference is now made to FIG. 1, which depicts a simplified view of an attraction and stimulation system 10 in accordance with one embodiment of the present invention. The system 10 comprises a programmable unit 100 which may be securely positioned on a vessel 105 in a body of water 110. The programmable unit 100 may be a portable, stand-alone unit, or may alternatively be integrated with vessel 105. It will be appreciated by those of skill in the art that programmable unit 100 may be used without any vessel 105; for example, programmable unit 100 may be used from shore, or on a pier or dock, or in numerous other environments.

The attraction and stimulation system 10 further comprises a submersible transducer device 115 which is enclosed in a watertight, waterproof housing and is suitable for deploying underwater. Submersible transducer device 115 may function as a speaker which transmits prerecorded sounds in order to attract and stimulate underwater animals, such as fish 120. Submersible transducer device 115 may also function as a hydrophone for monitoring or recording underwater acoustics. Submersible transducer device 115 may optionally be coupled to a flotation device for controlling the depth of the submersible transducer device 115. Submersible transducer device 115 may be suspended from the vessel 105 or from the programmable unit 100 via a wire or cable 125. Alternatively, submersible transducer device 115 may be coupled to or integrated with an anchor 130 connected to vessel 105. In other embodiments, submersible transducer device 115 may be mounted directly onto the vessel 105. For example, the submersible transducer device 115 may be mounted directly onto a motor housing or shaft, or may be removably attached to the side or bottom of the vessel 105.

Figure 2A:
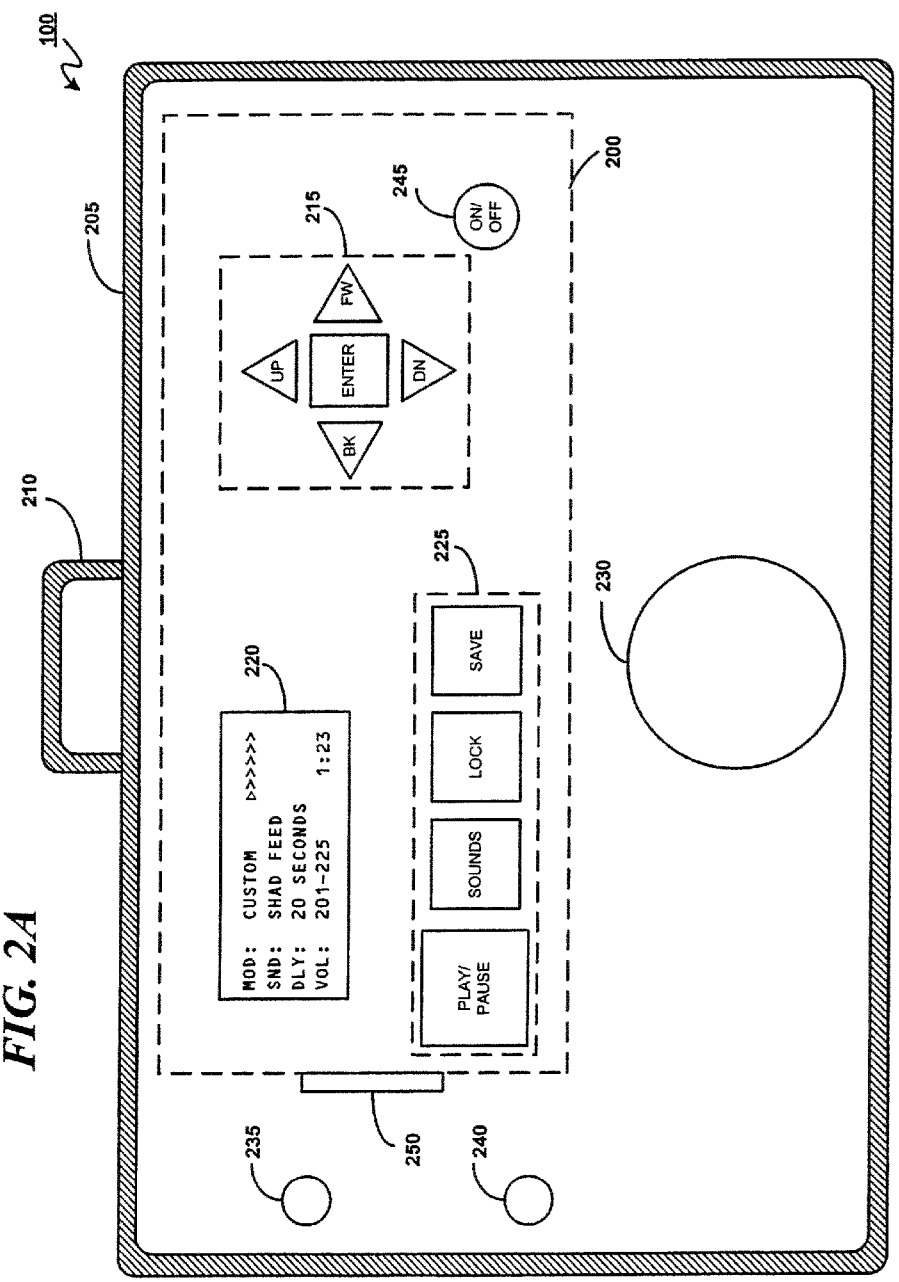
FIG. 2A depicts a front view of a control panel of a programmable unit in accordance with one embodiment of the present invention.

Reference is now made to FIG. 2A, which depicts a simplified front elevational view of a control panel of the programmable unit 100 in accordance with one embodiment of the invention. The programmable unit 100 may comprise a printed circuit board 200 which may be enclosed in a protective housing 205. Watertight protective cases such as those manufactured by Pelican Products, Inc. are suitable for use as housing 205. Housing 205 may comprise a handle 210 to facilitate carrying the portable, programmable unit 100.

The programmable unit 100 further comprises various input devices, which may include a waterproof, user-friendly keypad. As illustrated in FIG. 2A, various keys or buttons 215 may be provided for navigating a display 220. Additional keys or buttons 225 may be provided to allow for selection of various menu items shown in display 220. The display 220 may be an LCD (liquid crystal display), CRT (cathode ray tube), or other type of display screen. The display 220 may provide information to the user including but not limited to system settings, various menus for system operation, and status of the system. The example screen depicted in display 220 shows the following information:

MOD—the current mode of operation (e.g., normal, custom, load, or save);

SND—a selected sound (for example, the sound may be a recording of predatory fish feeding on baitfish);

DLY—a selected delay period between sounds (the delay may be zero if desired);

VOL—a volume setting (which may be constant or a range of volumes, including mute);

a speaker indicator (shown in the upper right hand corner of display 220); and a timer (shown in the lower right hand corner of display 220).

Menus may include, for example, a main menu, a sound selection menu, a delay selection menu, a volume selection menu, and a sequence selection menu, among others. The status of the system may include, without limitation, play, pause, a low battery indicator, or a speaker error indicator, etc. The status of the system and various menu items may be indicated audibly to the user, for example, by way of prerecorded spoken status messages and/or visually by way of displaying text or graphics on the display 220 or by illuminating various indicator lights 235 and 240.

In accordance with one embodiment of the present invention, delays or intermittency (of any desired time duration) between playback can be set between iterative plays of one specific sound, or between all sounds as programmed in a selected sequence, or between plays of each sound in a user selectable sequence of more than one different sound. These three system operations for delayed/intermittent playback are programmable such that each of single or multiple sequential sounds played back are individually programmable for a) volume and b) duration of playback.

Delay or intermittency between playback of one or multiple sounds has been shown in research tests to be more effective for attracting and, more specifically, maintaining the attraction for a longer time duration than merely playing the sound(s) incessantly. Specifically, with few exceptions, predator fish have been observed to be initially attracted to constant playback of various naturally occurring sounds, but lose interest rapidly and are seldom sighted again. However, when sound playbacks are played intermittently with delays (most commonly varying between approximately fifteen seconds and approximately 1 minute), the same fish initially attracted to sounds remain in the area of the sound source, or constantly return to the area of the sound source as observed via underwater camera surveillance. This behavioral pattern is similar to an effect humans would have when constantly calling someone's name versus intermittently calling someone's name. If someone constantly called a person's name, the person would first likely approach out of interest and curiosity, but would soon discover that the repetitive calling was not natural or purposeful and would lose interest and therefore not return later while the calling continued. On the other hand, if someone calls the person's name intermittently, the person likely would come back each time after a certain delay. This is even more apparent in fish whose memory duration is probably less than humans, and because their instinctive reaction tendencies are stronger than humans.

The functionality of the keys and the resultant output shown on the display 220 will now be described in accordance with one embodiment of the invention.

SOUNDS. When the SOUNDS key is pressed, the "SELECT SOUND" menu appears in the display 220, which allows the user to select from the available sounds. In addition, the prerecorded words "select sound" may be played for facilitating menu navigation by the user. By pressing the UP or DN (down) keys, the user may scroll up or down the list of available sounds shown in the display 220. The desired sound may be selected by pressing the ENTER key.

The available sounds may be chosen from a library of prerecorded signature sounds of certain fish or other species, and of fish being attacked and eaten by predators, or simulations thereof. In particular, the sounds and vibrations of predatory fish attacking, crunching, and swallowing baitfish are believed to trigger an aggressive response by other predatory fish, attracting them to the sound source and stimulating them to strike. This is due to the principle that if predatory fish sense that competing fish are feeding nearby, they become stimulated into becoming more aggressive and more likely to strike a fisherman's lure, for example. This effect may occur with a variety of gamefish, including but not limited to bass, bream, crappie, and numerous other freshwater and saltwater fish.

A pre-stored library of a wide variety of natural and synthetic sounds is provided and is equipped, programmable or expandable via digital media memory card to add more sounds to the sound library, as well as provide numerous variations of specific sounds, such as variations of a specific sound occurring in nature due to numerous factors: natural variations from the sound source such as fish making sounds of various frequencies and patterns, as well as local underwater conditions. The sounds and sound variations are derived via unique recording methods, including both recording natural sounds in a controlled tank or controlled habitat conditions, as well as recording of sound variations directly from natural habitats of various species. Each of these unique recording methods includes monitoring by hydrophone and use of acoustical spectrogram software for identifying the multiple sound variations made naturally by any given species, and by identifying additional sonic variations in natural or synthetic underwater sounds, which variations are due to numerous underwater physical conditions at any given natural underwater location/environment. These unique recording methods are accomplished by 1) recording sounds and sound variations of specific species in natural settings by locating sound recording systems (e.g., hydrophones, recorders, etc.) within a wide variety of underwater physical conditions (e.g., depth, clarity, salinity, subsurfaces, structures, etc.) and 2) creating artificial environments (e.g., tanks, etc.) wherein some or all of the variations occurring in natural settings are adequately duplicated such as for depth, clarity, salinity, structure, etc. such that recordings of sounds made by specific species (or even synthentic sounds) are obtained in multiple variations of sonic frequency "spectra" and sonic wave patterns just as or similar to variations occurring in natural underwater settings.

The sounds may range from very low sonic energy frequencies (referred to as vibrations or pressure waves) which are subsonic frequencies to human hearing, and conversely higher frequencies up to or exceeding approximately 20,000 Hz or ultrasonic to human hearing.

The above methods, techniques, and system functions are advantageous over the prior art which show no reliable method for obtaining multiple sounds representing the multiple variations of sounds/vibrations produced naturally in varied environments under diverse conditions, and which variations of sounds/vibrations are shown to be perceptible by various fish and other species. The present invention produces more natural and instinctive responses from fish and other species, thereby increasing effectiveness of fish attraction and fishing productivity according to all known science indicating fish attraction and aggressiveness to be increased proportionally to the exactness which the artificially produced stimuli imitates the physical characteristics of the naturally created stimuli.

UP/DN. In addition, pressing the UP or DN keys can also provide quick access to the SELECT VOLUME menu. This allows the user to quickly change the current volume setting.

PLAY/PAUSE. Pressing the PLAY/PAUSE key allows the user to play or pause the sounds.

LOCK. Pressing the LOCK key provides the user with the ability to lock the current system playback settings, including but not limited to sound, volume, delay, intermittency, playback timer, and others. Pressing the LOCK key once engages the lock feature, and pressing it again disengages the lock feature. Thus, at any time during active playback while in custom or normal operational mode (manual sound and volume selection via menu display), the user can LOCK all or a specific set of playback settings at their current position and prior to any automatic setting change (during custom program mode as per features above) or LOCK current positions as selected manually thereby avoiding any accidental change in system settings. In either case, these system functions are advantageous over the prior art in that the user can instantly by pressing a single button, lock the system playback settings at any given time, and particularly during custom (experimental) playback operations at the specific time when maximum effectiveness is identified by user such as when fish strike or when fish are observed being attracted to sounds being played. Additionally, the locked settings can be instantly saved into a built-in or portable memory device for subsequent activation thereby providing user can instantly operate a specific configuration of settings which previously proved effective.

Any custom configuration of settings spontaneously created or preprogrammed settings configuration can be saved and named or numbered by user for subsequent identification of particular settings group by system providing an on-screen alphanumeric selection chart including all letters of alphabet (any language) and/or any set of sequential numbers, symbols, or other identifiable icons, or any combination of the above which when selected in form of words or codes can be saved within system memory and later the name or code used for specific settings can be selected from an on-screen menu list and the corresponding custom settings loaded into system operations for instant activation of custom playback settings, such as those described previously.

SAVE. Pressing the SAVE key allows the user to save custom configurations. Thus, any custom playback configurations can be instantly saved by selecting a single button on the control panel. Instantly one or all of the custom settings as described herein can be saved in the system memory and instantly accessible to the user through selection within the SAVE or LOAD section of memory whereby one or more, or ALL custom settings saved previously are activated and made operational by selection from a menu or by pressing a button on the control panel to begin operation of the custom playback configuration saved previously. The system and methods of the present invention described herein provide advantages to a user over prior art systems with no such customization features, no such instant recall of settings and operation of previously saved custom settings, for optimizing both effectiveness and efficiency of the system.

BK/FW. By pressing the BK (back) or FW (forward) keys, the user can go backward or forward in the menu screens.

ENTER. By pressing the ENTER key, the user is able to select menu items. At other times, pressing ENTER allows the user to return to the Main Menu.

It will be appreciated by those of skill in the art that other types of input devices including but not limited to a touch screen, mouse, keyboard, numeric keypad, stylus, foot pedal, voice-driven command system, or other suitable input device or method may be employed without departing from the scope of the present invention.

Referring again to FIG. 2A, programmable unit 100 further comprises a speaker 230 which simultaneously emits the sounds also being emitted underwater by the submersible transducer device 115 shown in FIG. 1. This provides the user with the ability to continuously monitor and control the real-time playback of sounds as desired.

The programmable unit 100 may also comprise LED indicator lights 235 and 240. An ON/OFF switch 245 is also provided which can switch the power on or off. The programmable unit 100 may further comprise one or more expansion card slots or ports 250 for receiving an external data feed or memory module, including but not limited to a flash card, memory stick, or other portable storage medium, which may advantageously transfer, store, or load additional sounds or program upgrades into system storage.

Figure 2B:
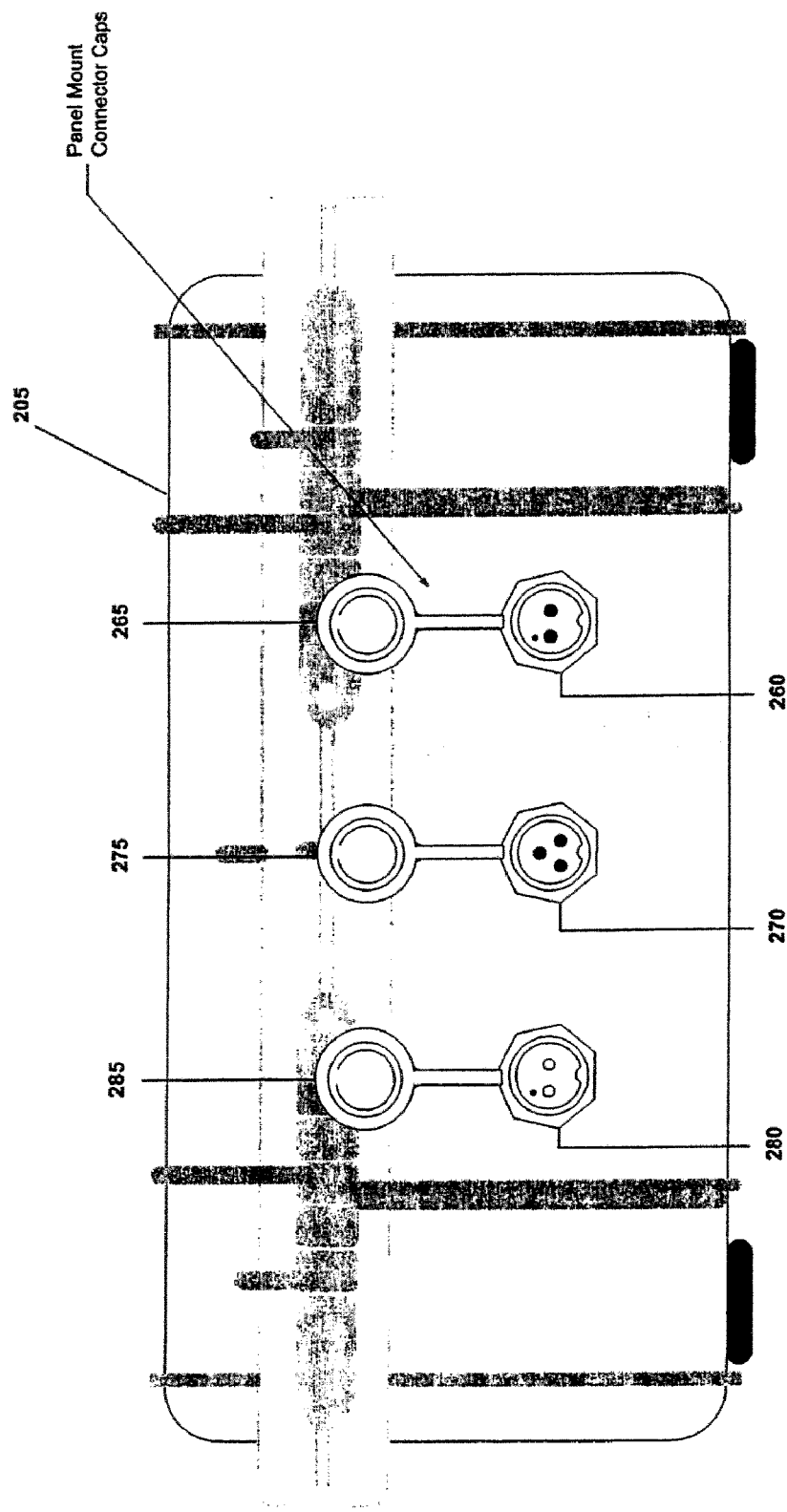
FIG. 2B depicts a bottom view of the programmable unit in accordance with one embodiment of the present invention.

Reference is now made to FIG. 2B, which depicts a bottom elevational view of the programmable unit 100. As shown, various connectors 260, 270, and 280 are provided, along with their respective protective caps 265, 275, and 285. Connector 260 may comprise a DC connector for receiving an AC/DC adapter, cigarette lighter adapter, or DC power port adapter. Connector 270 may comprise a plug or socket for receiving an input device such as a foot pedal input device, which allows for hands-free control of certain features of programmable unit 100. Connector 280 may comprise a speaker connector for facilitating connection to the submersible transducer device 115 via the cable or wire 125 shown in FIG. 1. Additional connectors to various input and output devices and other peripherals may be included, to enable, for example, downloading or transferring data to a separate data recorder, audio player, headphones or earphones, computer, or visual monitor.

The data channels and transmission ports may include digital I/O ports for inputting and outputting audio (or video or data) signals to or from a computer, which computer may also be connectable to the Internet or an Intranet network for downloading into the system or uploading from the system any system data including sound files, programming data, or any other system data files or software programs. For example, it will be useful to a user to be able to download from a central server or from another remote user one or more sounds or custom playback/settings configurations proven effective for various fish species or for specific fishing conditions. Such downloaded or uploaded data may be received free of charge to the user or may be accessible only after payment of a user fee to data provide, and data may be copy-protected or encrypted for protection against unauthorized duplication or transfer. Such proprietary data or software programs may be purchasable whereby a one time fee payed by a user via the Internet or otherwise renders the data product/program useable by the user indefinitely or the data may be rented from a data product provider for a limited time period whereby, unless the rented program is renewed and any fee transactions conducted, such proprietary data program/product is automatically erased from user's system or computer via a preprogrammed file deletion or program deactivation software which automatically activates deletion or deactivation of the rented or subscribed data program/product (received on line or via physical carrier) at which time an expiration date occurs, which functions are controlled by any suitable timer clock device available.

Figure 3:
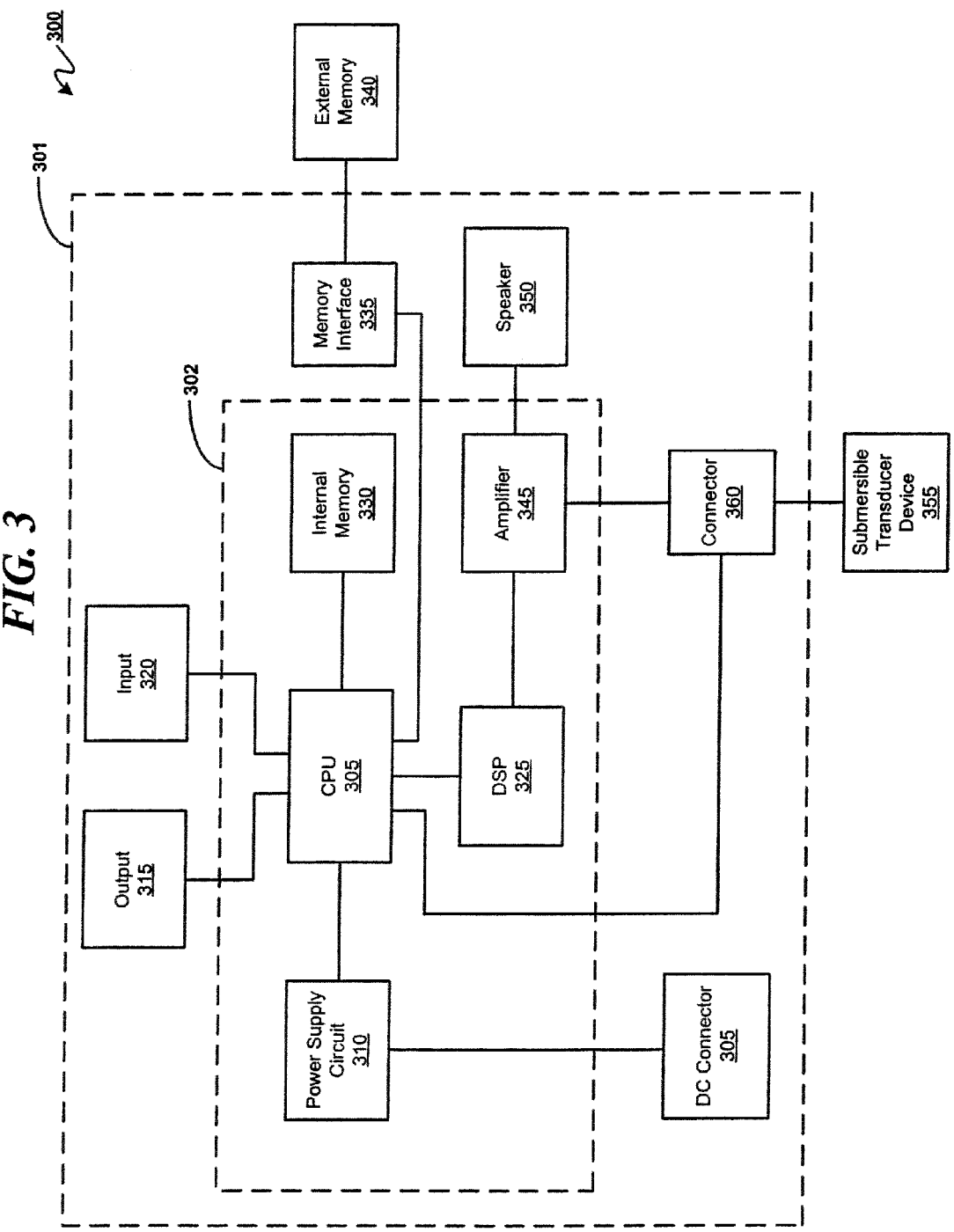
FIG. 3 depicts a block diagram of an attraction and stimulation system in accordance with one embodiment of the present invention.

Reference is now made to FIG. 3, which depicts a functional block diagram of the hardware components of a system 300 for attraction and stimulation in accordance with one embodiment of the present invention. As depicted in FIG. 3, the system comprises a programmable unit 301, which may take the form of the programmable unit 100 shown in FIGS. 1 and 2A-2B. As shown in FIG. 3, a central processing unit (referred to as "CPU" or "processor") 305 is provided, which may be attached to a printed circuit board 302, and may be connected via one or more transmission paths to the following components: a power supply circuit 310; one or more output devices 315; one or more input devices 320; a digital signal processor (DSP) 325; one or more internal memories 330; and a memory interface 335, which may be connected to one or more external memories 340. An example of a suitable processor 305 that may be used in accordance with one embodiment of the invention is the PIC18LF6720 microcontroller manufactured by Microchip.

Power supply circuit 310 may comprise a battery recharging circuit that provides constant-current or programmable-current and constant-voltage battery charging. A suitable battery recharging circuit includes without limitation the LT1513 manufactured by Linear Technology. Power supply circuit 310 may be connected to a small rechargeable battery, and may optionally be connected to an AC-to-DC converter or a DC power adapter, via a DC connector 305, such as the connector 260 shown in FIG. 2B.

The output devices 315 may comprise, for example, a display device including but not limited to the display 220 shown in FIG. 2A. The input devices 320 may comprise, for example, a keypad comprising keys or buttons 215 and 225 shown in FIG. 2A, and may further comprise a foot pedal or other foot-controlled input device.

CPU 305 reads data from one or more internal memories 330. Internal memories 330 may include without limitation a hard disk drive, a flash memory or other suitable data storage medium. In addition, CPU 305 may also read data from one or more external memories 340 via memory interface 335, which may be located on printed circuit board 302, or on a daughterboard (not shown). External memories 340 may include without limitation a flash memory such as a CompactFlash card, a pluggable memory stick, or other suitable data storage media. Internal memories 330 and external memories 340 function as storage media for a library of sound recordings, including without limitation, sounds of various prerecorded signature sounds made by fish and other species, and in particular, sounds of prey being attacked and eaten by predators, or simulations thereof. When played underwater, the sounds and vibrations attract predatory gamefish and stimulate them to more aggressively feed and strike. In addition, the sounds and vibrations can also attract and stimulate baitfish, which in turn may attract predatory fish.

DSP 325 may comprise an audio codec (coder/decoder) chip, such as the VS1001K manufactured by VLSI Solution Oy, and may include digital-to-analog converter (DAC) and analog-to-digital converter (ADC) functions. The decoded digital data that is read from memories 330 or 340 is transformed into analog format by the DAC function, and the analog data is transmitted to an amplifier 345. Suitable models of amplifier 345 include without limitation the TDA1905 audio power amplifier and the TDA1517ATW power amplifier, both manufactured by Philips. The amplified signal is converted to sound through internal speaker 350 which may be audible to the user, or may alternatively be heard by the user via an earphone or headphone (not shown). Simultaneously, the amplified signal is transmitted to an underwater transducer device 355, such as the submersible transducer device designated by reference numeral 115 in FIG. 1., via a connector 360, such as the connector 280 shown in FIG. 2B. Although DSP 325 and amplifier 345 are shown as separate elements in FIG. 3 for purposes of clarity, it will be apparent to those of skill in the art that their functions may be combined into a single integrated circuit.

Figure 4:
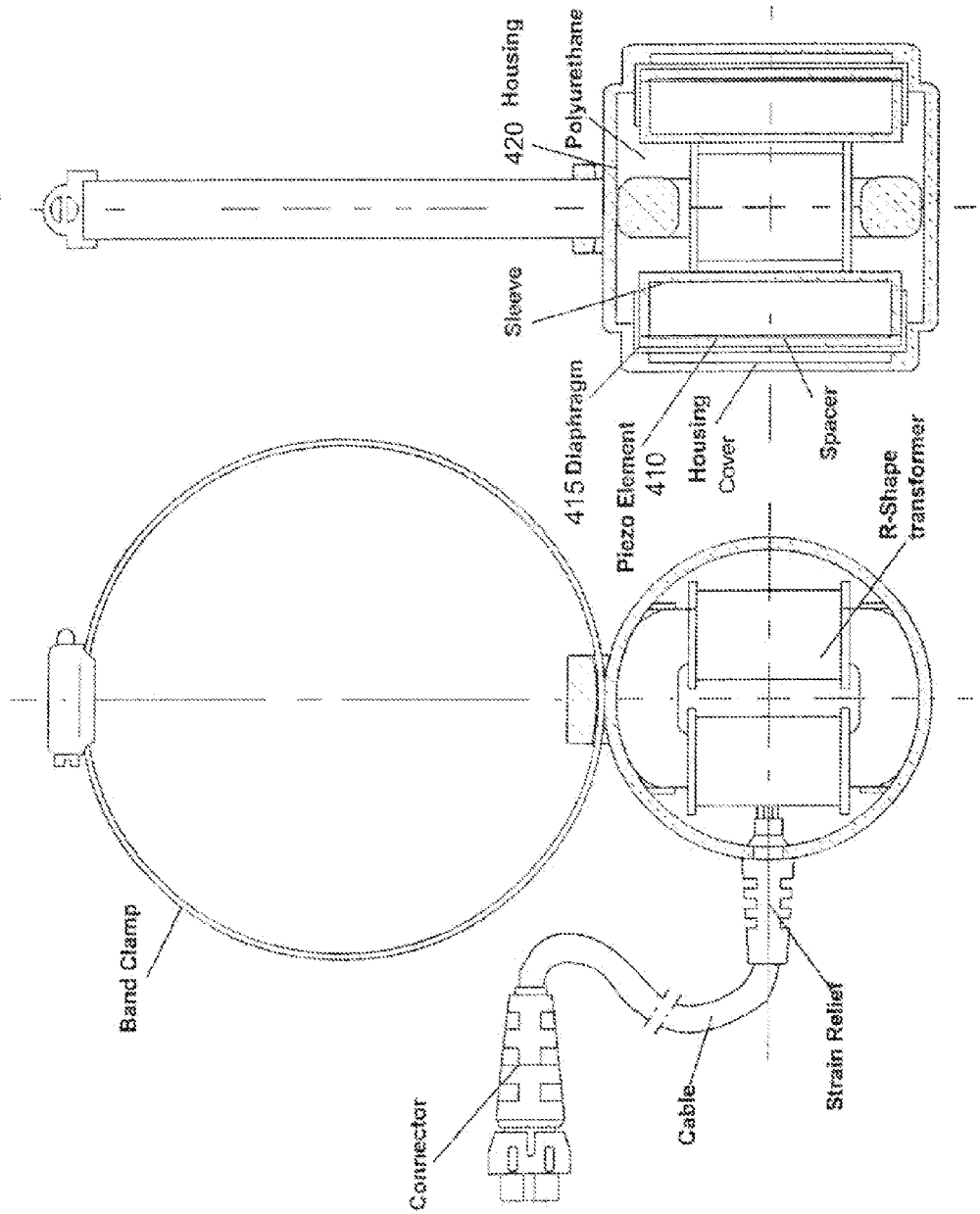
FIGS. 4A and 4B depict cross-sectional views of a submersible transducer device in accordance with one embodiment of the present invention.

Reference is now made to FIGS. 4A and 4B, which depict cross-sectional diagrams of the submersible transducer device 115 of FIG. 1. Submersible transducer device 115 may include one or more transducer elements such as piezo elements 410 and a diaphragm 415 within a watertight, waterproof housing 420. In one embodiment, two piezo ceramic speaker elements 410 are positioned opposite from each other within the watertight, waterproof housing, thereby creating optimal sonic projection of both sound fidelity (frequency range) and maximizing sound volume or power output measured in decibels. A configuration using at least two piezo speaker elements (or any other speaker element) 410 projects sound in opposite directions, creating maximum sonic panoramic range, and reducing or eliminating "dead spaces" or "dead zones," i. e., directional paths where the acoustic signals or sonic pressure waves do not travel.

Submersible transducer device 115 may also function as a hydrophone for monitoring or recording underwater acoustics. The underwater speaker function may be instantly converted to act as a hydrophone by a switch mechanism located at the programmable unit's control panel. The piezo ceramic element or other speaker element 410 or diaphragm 415 is inherently a sufficient physical medium for receiving sound and vibration signals of a specific sonic spectra depending on the size and other characteristics of the speaker element used. Upon switching to hydrophone mode, the system activates the sound signal/acoustic energy-receiving conduit which relays the received signals back to the programmable unit 100 for processing. This processing may include A/D conversion, signal amplification, signal data storage (analog or digital form), and signal interpretation. Signal interpretation may include identifying the sound or vibration source via acoustic spectra analysis, distance of sound source, direction of sound source, depth of sound source, or measuring the sound intensity. One way the direction of signal source is identified is by use of the speaker's omni-directional signal receiver capabilities and use of a sound intensity or volume meter which identifies and registers the maximum volume decibel level at any given position within the scope of the omni-directional signal reception range, thereby specifically identifying the directional location of the sound signal source received by the speaker and relayed to the system's CPU.

In one embodiment, the system is programmable to automatically switch between the hydrophone mode of operation and the speaker playback mode of operation. This automatic function can be activated by operating a control panel switch. In this automatic switching mode, the system alternates between speaker sound/playback mode and hydrophone signal receiver/processor mode and may be operational in equal, variable or individually selectable time durations between the two modes. In other words, the system can playback sounds for a certain amount of time, then automatically (or manually by the user) switch to the hydrophone mode, wherein the system "listens" for sounds and processes them as described previously for identifying, locating specific sounds and alerting the user to such sound identification and sound source locations.

If no specific targeted sounds are identified or located during the hydrophone mode, then the system may automatically revert back to playback mode as programmed by user in advance. If the system does locate and identify a target (i.e., a match to any of various predetermined sounds selectable by the user or based on criteria from auto programming), then the system can alert the user and allow the user within a designated period of time to make further programming selections according to data registered and displayed visibly on-screen or audibly conveyed during the hydrophone operational mode. If the user does not make a further selection for operations within the time period allowed (which time period may be pre-programmable by user), then the system may automatically revert to the previously selected operation of alternating between the sound playback and hydrophone operational modes. The audible alert/alarm functions described above may also include designation (by user selection or factory preset) of certain sounds, tones, sound patterns, spoken words, etc., to be transmitted from the above-water speaker, which specific audible signals correlate with or represent specific underwater sounds or other values as described previously, which sounds or sounds sources, sound distances, sound source locations, or other values assist the user to immediately act upon the information for purposes of identifying and locating feeding fish, for example.

Additionally, the system is programmable to automatically engage various system functions when, for example, the system identifies or locates specific fish or other underwater objects or activities. For example, when in the hydrophone mode, the system can identify the presence of schooling fish such as bass, for example, and the system may automatically initiate playback of certain pre-stored or spontaneously recorded natural or synthetically produced sounds known to attract schooling bass. Alternately using such features, the system may automatically engage a built-in GPS (global positioning system) receiver or sound source direction/position calculator so that the user may immediately locate and move to the approximate position of the schooling bass, thereby improving fishing productivity or optimizing scientific studies prior to the spontaneous underwater bio-activity ending.

In one embodiment of the invention, the hydrophone may be used to record or monitor underwater acoustics, which may be compared and analyzed for a match to any of the particular "signature" sounds that are stored in memory. The signal identification and interpretation discussed previously may thus include identifying the natural or artificial sound source, either specifically or by general categories. This is accomplished by including a pre-stored library of specific natural or artificial sounds and vibrations in digital format, whereby the received sound signals are converted to digital files of sonic signature identification data (i. e., unique sonic characteristics of individual sounds and vibrations received), and whereby the system includes acoustic analysis/acoustic comparison software which compares the sonic "signature" profile values of the signals received by the underwater speaker/hydrophone with the prerecorded/pre-stored signature sound profile values for determining the existence of an exact or qualified match between the received and pre-stored signature sound profile data, thereby identifying the received sound source due to the system's pre-stored identification of sound signature values collected from specific sound sources prior to installation within the pre-stored sound library.

In addition, the system has the capability to record, store and process spontaneously received sound signals received by the submersible transducer device 115 which sounds may be later played back underwater. The system can also match the spontaneously received and stored sounds with pre-stored sounds and identify the sound source as described above, and then the system may play back the spontaneously received identified sound as a substitute for the same or similar pre-stored sound so to produce playback of a sound which is more identical to the natural or artificial sound produced within the specific underwater environment where fishermen or sonic researchers use the system, such as: receiving, storing, identifying, and playing back the sounds made be a certain species of shad which are prevalent to the present body of water, as opposed to playing back a prerecorded shad sound of less identical sonic characteristics.

The values and identifications of sounds and vibrations discussed above which the system has pre-stored or spontaneously produced may be displayed on the system's display screen when produced or identified and/or audibly announced. Additionally, the system may automatically alert the user to the identification of a specific sound source, the direction of sound source, and any other above-described identification capabilities by use of the system's built-in air speaker which may transmit a general or identification-specific sonic "alarm," alerting the user, for example, that the system has identified the presence of a school of largemouth bass feeding upon a school of threadfin shad, as well as identifying both the direction of the feeding activity, and the approximate distance of the feeding activity from the system. The latter is achieved in a similar manner of processing which the system uses to identify the direction of the sound source by omni-directional monitoring of sounds received and by identifying and registering the directional position of the underwater speaker where the maximum level of sound energy from the feeding bass in this example is received. The direction identified will preferably be measured on an omni-directional plane which is generally on the same plane with the water surface. The system automatically identifies the distance from the system to the received sound source by triangular location techniques managed by the user via pre-installed or pluggable software for calculating actual linear distance across the water surface area to a point directly above the underwater sound. The precise or general geographic position is determined by calculating the distance of sound energy received from the underwater sound source, whereby the above water distance from the sound source is identified automatically by triangular position calculations as noted above. The above water geographic position directly above the underwater sound source may also be identified and displayed in the form of a GPS reading which identifies the longitude and latitude of the geographical position located by system directly above the area of the feeding bass in this example, accomplished by the system comprising a GPS device operably connected to other system processors, circuitries, and software used for sound source identification and for measuring the distance of the sound source from the system or the system user.

Submersible transducer device 115 may also comprise a sonar transducer which in addition to all other system functions described previously can transmit sound signals and receive sound signals or reflections, enabling screen sonar graphs of underwater topography, fish or other underwater objects, as well as measuring the depth of water, all of which information may be displayed on the system's display screen.

In one embodiment of the present invention, submersible transducer device 115 may further comprise an underwater video camera. In this embodiment, the system may include a display screen which is automatically or manually activated by the user according to pre-programmed settings or via programmable criteria-based activation so that the user can visually monitor underwater activities detected by the system's hydrophone functions. The system may also automatically, or upon the user's command, record the underwater video activity which has been sonically detected and identified by the system as of interest to the user, which recordings (audio and video simultaneously) can later at any time be viewed by user on the display, or transferred to other audio/video devices, computers, etc. for review and further processing. It will be appreciated by those of skill in the art that the video camera may disposed within the housing of the submersible transducer device 115, or alternatively, the video camera may be functionally connected to the submersible transducer device 115.

The system may also automatically activate video surveillance or video recording, or any of the system's above-described functions, in accordance with specific or non-specific underwater events, which are detected by the system's hydrophone, an underwater video camera, a motion detector, or other sensor device. For example, the system may first detect and identify (in hydrophone mode) the presence of crawfish moving about on rocks underwater. The system may then automatically engage playback of pre-stored natural sounds of bass feeding upon live crawfish at specific or variable volume levels as desired and using specific or variable playback patterns. Following a programmable playback duration, the system may automatically convert to operating in the alternating speaker/hydrophone operational mode described above wherein the system alternates between playing back the pre-stored crawfish sounds and monitoring perceptible underwater acoustics via the hydrophone function. Upon the system's detecting and identifying the presence of bass, for example, which have been attracted into the range of the system's detection, the system may automatically activate the underwater video camera to allow the user to visually monitor and/or record the underwater scenes for subsequent display.

The system may also include a built-in underwater or above water signal transceiver which can send and receive data signals produced by the system, either to or from another system or a compatible system, thereby enabling communications and sharing of information between multiple fishermen or researchers. The system may also transmit data to a remote receiver located on land or water, which data is received and stored for spontaneous or subsequent access by the user or for further processing by a computer. Such data transmission capabilities include use of an audio or video data/signal transmitter and remote receiver.

The system signal transceiver may also provide that the system and all system operations and programming may be remotely controlled and monitored by a user or computer programmed operation. This is very useful, for example, for fisherman to set the system to monitor sonically and/or visually underwater bio-activities of importance to the user even when the user is in a remote location from the system. For example, a fisherman or researcher may install the system at a pier or dock and a user can remotely monitor and operate the system for purposes such as attracting gamefish prior to the fisherman's arrival at the system's location, or for alerting a fisherman or researcher to specific underwater events whereby the system user can then activate various programming operations either remotely or at the system location. Advantageously, this saves valuable time for the fishermen and researchers and optimizes the system's effectiveness and convenience to the user.

Submersible transducer device 115 may further include a programmable light emitting device, such as an infrared light, which may be varied in intensity in order to accommodate or compensate for particular conditions (such as time of day or water clarity, etc.). The built-in or attachable lighting device may comprise a single or multiple light bulbs or LEDs which are designed to attract fish and which might be in the form of a series of LED lights which flash or flicker in a pre-programmed pattern which imitates, for example, the flashing of a school of bait fish under sunlight, moonlight or artificial light conditions. The combination of the optional light attraction features and sonic attraction features of the present invention together increase the attraction and stimulation capabilities which further enhance the system's effectiveness.

Figure 5:
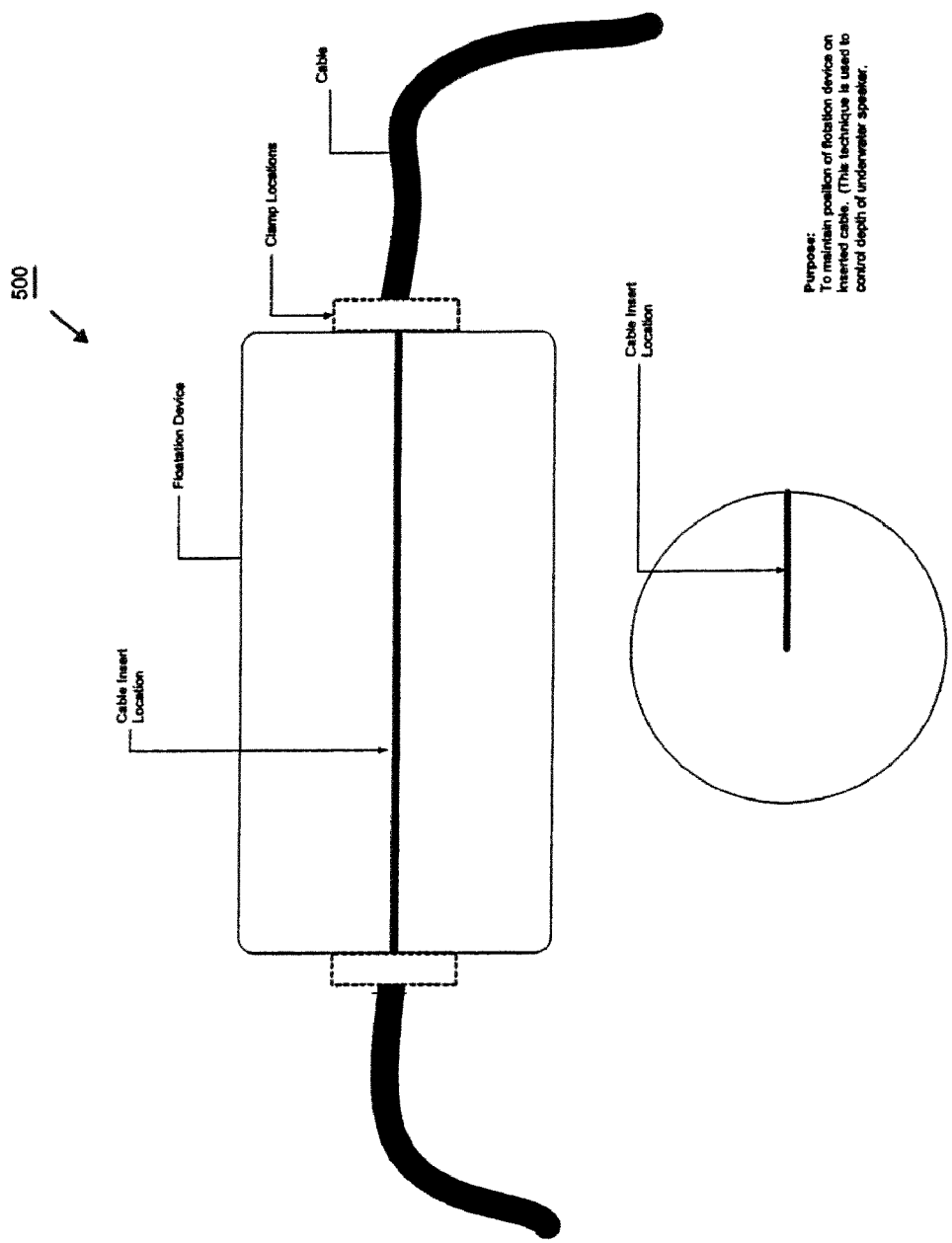
FIG. 5 depicts a block diagram of a flotation device in accordance with one embodiment of the present invention.

Submersible transducer device 115 may further include diving planes or rudders to allow for depth control, orientation, and attitude while trolling. Submersible transducer device 115 may optionally include or be attached to a flotation device for controlling the depth of the submersible transducer device 115. A suitable flotation device 500 which may be attached to the submersible transducer device 115 is depicted in FIG. 5. The flotation device 500 may comprise foam, such as polyethylene foam, and allows the user to adjust the depth of the submersible transducer device 115. Other suitable methods and devices may be employed to control the depth of the submersible transducer device 115.

The submersible transducer device 115 may further comprise a water clarity meter, which may affect the control of sound volumes automatically, for example, when stained or ultra clear water is detected, or by selecting sound sequences that have been proven more effective in these clarity extremes automatically. The submersible transducer device 115 may further include temperature gauges, oxygen meters, and pH meters to further enhance a fisherman's effectiveness for not only attracting but also stimulating a fish to strike a lure.

Reference is now made to FIGS. 6 and 7, which depict process flow diagrams for operation of a system for attraction and stimulation in accordance with one embodiment of the present invention. Four modes of operation are described in further detail below as follows (1) Normal; (2) Custom; (3) Load; and (4) Save. The modes of operation may be presented to the user in a Main Menu as depicted in step 600.

If Normal Mode 602 is selected, the user may select a single sound and a single volume setting. As depicted in step 605, the user may select a sound from a menu or list of available sounds. The available sounds may be read from an internal memory device or an external memory device, as described above in connection with FIG. 3. In addition, the user can select a volume level for the specific sound selected as shown in step 610. Once the sound and volume are selected, a screen may appear which displays the current settings, and the system may then begin playing the selected sound at the selected volume level. The system may continue to play the sound in a continuous loop until a certain condition occurs that interrupts continuous play, such as, for example, the powering off the system or pressing a key and changing the current configuration.

If Custom Mode 615 is selected, the following options may be available which advantageously allow customization of the sonic attraction and stimulation system: (1) Play All (i.e., play all sounds); (2) Select Sequence (i.e., the user may select a sequence of two or more sounds to be played); and (3) Play Selected Single Sound (i.e., the user may select a single sound to be played at a variable volume setting). The user may select from any of these options in step 617.

If the "Play All" option of the Custom Mode is determined to have been selected in decision 617, all available sounds may be queued and played. As shown in step 620, a volume setting may also be selected. Furthermore, a delay setting may also be selected as shown in step 625, which delay represents the time between the playing of the current sound and the next sound in the queue. The delay may be, for example, a number of seconds or minutes selected by the user, including zero. If the delay is set to zero, then the sounds will be played continuously; otherwise, the sounds will be played intermittently. The settings may be programmed by using the keypad 215 shown in FIG. 2A. For example, from the Main Menu, the user may scroll the up and down keys to highlight the Custom Mode, and press the enter key. A menu may appear in the display 220 shown in FIG. 2A, which presents the various options, and the "Play All" option may be highlighted using the up and down keys, and selected by pressing the enter key. Another menu may appear which presents various volume settings, and the desired setting may be highlighted by using the up and down keys, and selected by pressing enter. Another menu may appear which presents various delay times, and the desired delay may be highlighted using the up and down keys, and selected by pressing enter.

If the "Select Sequence" option of the Custom Mode is determined to have been selected in decision 617, the user may select individual sounds as desired as well as a specific sequence of playback. As illustrated in FIG. 7, once a particular sound is selected in step 705, the user may be automatically presented with a Select Sequence Menu and allowed to arrange the sequence of the selected sound(s) in step 710. The user may further be presented with a Select Volume menu as shown in step 715, and allowed to select a volume level for that sound. After selecting the volume level, the user may be presented with a Select Sequence Menu as in step 710 and allowed to select another sound. This process may be repeated until all desired sounds are queued, and the user may then select a delay period between sounds in step 720. If the delay is set to zero, then the sounds will be played continuously; otherwise, the sounds will be played intermittently.

In addition, a "Sound Sweep" mode may be included which provides that any set of multiple sounds can be programmed to playback in a first to last or last to first order as listed on sound file selection menus, or programmable in any specific order and number of sounds as user selects from on screen menu page of LCD. Additionally, either by factory presets or user programming, the Sound Sweeps may be configured such that multiple specific sounds are linked in sequence for automatic playback which are preprogrammed (by factory or user) to playback at specific volume levels known to be most effective for each specific sound and auto-played back for a specific time duration shown optimally effective for the specific sounds. This feature is a significant improvement over the prior art which shows no such functionality and which is not as effective or efficient for maximizing fish attraction which these functions provide due to critical need for customizing volume and sound settings for determining most effective one under varying conditions, diverse field locations, and as applied to specific fish and other marine and aquatic species.

The process flow for the "Play Selected Sound" option of the Custom Mode is depicted in FIG. 7. If the "Play Selected Sound" mode has been determined to have been selected in decision 617, the user may select an individual sound to be repeatedly played, and variably control the volume level at which the sound is played. The user may also control the delay period between iterations of playing the sound. Various modes for controlling the volume are provided as follows: (1) Sweep All Mode; and (2) Single Volume Mode. If the "Sweep All Mode" is selected in step 725, then playback may be at gradually increasing volume levels up to the user's selected maximum volume as selected in step 730. The volume may also be automatically decreased, or may be randomized. The user may also select an interval of, for example, a number of minutes or seconds, between the increases in volume levels as shown in step 735. A delay period may be chosen between iterations of playing the same sound as shown in step 740. Alternatively, if the "Single Volume Mode" is selected, then a single volume level is selected, and the user may also select a delay period between iterations of replaying the same sound in step 740. If the delay is set to zero, then the sound will be played continuously; otherwise, the sound will be played intermittently.

The "Sweep All Mode" provides many advantages over the prior art because research shows that various volume levels are most effective for use of certain sounds, due to the nature of the sound itself, the response characteristics of targeted fish species, the specific underwater environment applied (e.g., depth, structure, surface materials, clarity, etc. effect optimal volume settings differently from one sound to the other). Additionally, as is well established in sport fishing generally, the aggressiveness level of any given fish or given fish species is constantly changing due to numerous biological and environmental factors at any given time, such as last feeding, season, habits of specific species, water clarity, depth, local forage, weather conditions, and numerous other conditions and factors. Due to these ever-changing factors, fishing productivity is also known to be optimized when certain fishing techniques and fishing lures/bait are used which are most effective for the given set of variables noted above. In general, productivity is known to increase when fishing techniques and fishing lures are experimented by fishermen usually beginning with most aggressive lures and techniques (such as those causing the loudest underwater sounds/vibrations, most brilliant color patterns, and which are retrieved swiftly through the water), and progressing to the most subtle techniques/lures of the opposite qualities. The same or similar dynamic is shown to be more productive in attracting and catching fish when sounds are applied, i. e., use of more subtle sounds and playback techniques are shown most effective when fish activity levels are lowest, and vice versa. As it relates to sound volume, this means that the most effective volume levels may be a volume at any given level from lowest to highest depending on both the fish bio-activity level (or Threshold strike level) and depending on numerous local conditions as noted above. Therefore, the present invention provides for experimentation with sound playback methods for determining the most effective sounds, sound volume levels, optimal intermittency/delay between sound, and other programmable variations to sounds and sound playback techniques.

Referring again to FIG. 6, if the Save Mode 640 is selected, the user is able to save a custom configuration. Upon selecting the Save Mode 600, the user may be presented with a Save Program Menu as shown in step 645. A desired storage location may be selected, and if a program is already stored in the desired storage location, the user may choose whether or not to overwrite that location as shown in step 650. Advantageously, if a particular choice of settings yields positive results in attracting and/or stimulating aquatic species, then the user may save the settings quickly, for example, by pressing the SAVE button shown in FIG. 2A. Furthermore, the saved settings may be associated with various information identifying the environment or other conditions present during operation of the saved settings, including but not limited to the time of day, time of year, GPS coordinates, water depth, species attracted, water clarity, light intensity, etc., so that the user may be able to easily recall such settings when faced with the same or similar environment or conditions.

A previously saved configuration of settings may be loaded by selecting the Load Mode 630 from the main menu. As shown in step 635, when the Load Mode is selected, a list of all previously saved, customized programs may be presented. The user may scroll through the list and select the desired program. Advantageously, a previously saved customized program may be automatically loaded or suggested to be loaded by the system when, for example, the system identifies the same or similar conditions which are associated with the save program. For example, if a particular custom program that was previously saved is associated with a particular geographic location and was found to be particularly successful in attracting and stimulating aggressive feeding behavior in a certain desirable species of fish, the user may wish to load that program whenever the user fishes in that geographic location. Advantageously, this can remove a lot of the guesswork or "trial and error" that can be associated with fishing, thereby saving fishermen valuable time and increasing their productivity and efficiency.

The benefits and advantages of the present invention were observed in field tests, as described further below. The visual testing protocol has included extensive underwater monitoring by scuba divers and the use of underwater cameras. Tests were varied to focus exclusively upon monitoring fish attraction to digital "signature" sounds, and for testing its effectiveness for attracting multiple species. Test results were monitored in real time, recorded, and later analyzed in detail by a number of researchers. Testing by underwater visual (scuba diver), and underwater camera monitoring began with a base line of zero fish sightings after a ten to fifteen minute observation period. The sonic attraction and stimulation system of the present invention was then turned on and elapsed time monitored until sighting the first fish, then a total fish and species count for the remainder of the fifteen-minute test period.

Fishing test protocol focused on a fish count of both fish caught and verified strikes. The primary focus was on the system's ability to attract and stimulate fish to feed, and not on the fisherman's skill at lure presentation or his ability to set the hook in a timely fashion. Field testers would approach a section of water and first fish with a particular lure without the system for fifteen minutes (average test time). After the fish count was verified, using the same lure, the testers would begin fishing with the system on for fifteen minutes within the same section of water. Three groups of field tests were conducted, and are described in further detail below.

Field Test No. 1.

Tests were conducted in Louisiana by two fishermen in poor conditions. As depicted in Table 1 below, four runs were conducted, each of which included fifteen minutes of fishing with the fish attraction and stimulation system of the present invention off, and fifteen minutes of fishing with the system on. A total of zero fish strikes or catches were recorded with the system off, while two fish strikes or catches were recorded with the system on.

TABLE 1

Field Test No. 1 (Good Conditions)

| | SYSTEM OFF | Fish | SYSTEM ON | Fish |
|---|---|---|---|---|
| Test 1 | 15 min. | 0 | 15 min. | 1 |
| Test 2 | 15 min. | 0 | 15 min. | 0 |
| Test 3 | 15 min. | 0 | 15 min. | 0 |
| Test 4 | 15 min. | 0 | 15 min. | 1 |
| Total | 60 min. | 0 | 60 min. | 2 |

Field Test No. 2.

Tests were conducted in Florida by two fishermen in fair conditions. As depicted in Table 2 below, five runs were conducted, each of which included fifteen minutes of fishing with the fish attraction and stimulation system off, and fifteen minutes of fishing with the system on. A total of two fish strikes or catches were recorded with the system off, while four fish strikes or catches were recorded with the system on.

TABLE 2

Field Test No. 2 (Fair Conditions)

| | SYSTEM OFF | Fish | SYSTEM ON | Fish |
|---|---|---|---|---|
| Test 1 | 15 min. | 0 | 15 min. | 0 |
| Test 2 | 15 min. | 1 | 15 min. | 1 |
| Test 3 | 15 min. | 1 | 15 min. | 1 |
| Test 4 | 15 min. | 0 | 15 min. | 1 |
| Test 5 | 15 min. | 0 | 15 min. | 1 |
| Total | 75 min. | 2 | 75 min. | 4 |

Field Test No. 3.

Tests were conducted in Florida by three fishermen in good conditions. As depicted in Table 3 below, five runs were conducted, each of which included a number of minutes of fishing with the fish attraction and stimulation system off, and the same number of minutes of fishing with the system on. A total of six fish strikes or catches were recorded with the system off, while nineteen fish strikes or catches were recorded with the system on.

TABLE 3

Field Test No. 3 (Good Conditions)

| | SYSTEM OFF | Fish | SYSTEM ON | Fish |
|---|---|---|---|---|
| Test 1 | 20 min. | 3 | 20 min. | 5 |
| Test 2 | 15 min. | 2 | 15 min. | 3 |
| Test 3 | 10 min. | 1 | 10 min. | 3 |
| Test 4 | 15 min. | 0 | 15 min. | 3 |
| Test 5 | 30 min. | 0 | 30 min. | 5 |
| Total | 90 min. | 6 | 90 min. | 19 |

The test results have shown the present invention to be effective for attracting gamefish and stimulating increased aggressiveness and feeding behavior. Analysis of the tests indicates that the effectiveness of the present invention for increasing the number of fish caught may be relative to the general fishing conditions at any given time and location. During the poorest fishing conditions and when catching any fish at all is a task, the present invention has been shown to produce better results than fishing without it. In other words, when fishing is at its poorest, the present invention can make the difference between catching no fish at all and catching some fish. As fishing conditions improve and fish become more aggressive, the results of the present invention become increasingly dramatic. This is believed to result from the invention's capability of attracting "active" fish into the fishermen's casting range, and stimulating fish to become more alert and more aggressive, and thereby more likely to strike a properly presented lure. The net result of all field testing to date is a consistent pattern of more effective fishing when the present invention is used. Field testing has shown the present invention to be particularly effective for bass, bream, crappie, and numerous other freshwater fish, as well as indicating effectiveness on a variety of saltwater species. Further enhancing the value of the present invention to fishermen and researches are the system's vast programmability options, which allow for experimentation with a diversity of sound playback settings and techniques, thereby providing the opportunity to increase system effectiveness as applied during all biological activity levels or relative fishing conditions as described previously.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as exemplary embodiments. Various changes may be made in the shape, size, and arrangement of parts. For example, equivalent elements or materials may be substitute for those illustrated and described herein, and certain features of the invention may be utilized independently of the use of other features, all as would be apparent to one skilled in the art after having the benefit of this description of the invention.

In particular, although the principles of the present invention are of particular use in the fields of fishing and scientific research, it should be appreciated by those of skill in the art that the principles of the present invention are not limited in scope to such fields of use. For example, the principles of the present invention may find application in a variety of fields, including but not limited to sport fishing, commercial fishing, scientific research, medicine, and other acoustic research and development applications. Specific examples of application of the principles of the present invention include without limitation use by long line fisherman to attract a targeted species, stimulate the species to strike a fishing lure or bait, and repel unwanted species such as dolphins; use by commercial fishers to catch more fish in a shorter amount of time; use in the medical field for treating conditions such as insomnia; and use by scuba divers for enhancing safety by transmitting audible alerts underwater or repelling sharks or other unwanted species. In addition, while the term "fish" is often used in various portions of the specification, such term is intended to include fish and other aquatic animals, including but not limited to turtles, whales, sharks, dolphins, and others. Furthermore, while the term "sound(s)" has been used in various portions of the specification, such term is intended to include both acoustical vibrations and sounds; likewise, the term "sonic" as used in the specification is intended to include without limitation acoustic, sonic, subsonic, and ultrasonic.

What is claimed is:

1. A submersible device for attracting and stimulating aquatic animals, said device comprising:
    a watertight housing;
    a first transducer element disposed within said housing; and
    a diaphragm operably connected to said first transducer element,
    wherein said first transducer element is selectively operable as either a speaker or a hydrophone in response to control signals received by said submersible device from a programmable device above water; and
    wherein said device emits one or more acoustical signals in a specified sequence and at a specified volume in response to control signals received from said programmable device above water; and
    wherein said one or more acoustical signals comprise a sound of prey being attacked and eaten underwater; and
    wherein said device is adapted to relay signals received by said first transducer element to said programmable device for processing or display in response to control signals received by said submersible device from said programmable device above water.

2. The submersible device as claimed in claim 1, further comprising:
    a second transducer element disposed within said housing; and
    a second diaphragm operably connected to said second transducer element,
    wherein said second transducer element is positioned opposite said first transducer element, and
    wherein said second transducer element is selectively operable as either a speaker or a hydrophone in response to control signals received by said submersible device from a programmable device above water; and
    wherein said submersible device is adapted to relay signals received by said second transducer element to said programmable device for processing in response to control signals received by said submersible device from said programmable device above water.

3. The submersible device as claimed in claim 1, further comprising a flotation device coupled to said housing.

4. A system for attracting and stimulating aquatic animals, said system comprising:
    a submersible device comprising a transducer element disposed within a watertight housing; and
    a programmable control unit operably linked to said submersible device, said programmable control unit comprising:
        a processor;
        a memory device operably connected to said processor, for storing a plurality of sets of digitally prerecorded sounds, at least some of which relate to sounds associated with aquatic prey; and
        an input device including a user interface comprising a plurality of user-selectable options including said sets of digitally prerecorded sounds, sequence and volume for user selection of a custom program including one or more said sets of digitally prerecorded sounds in a specified sequence and at a specified volume, said input device is operably connected to said processor for transmitting the user-selected custom program including one or more of said plurality of sets of digitally prerecorded sounds to be played according to the user-selected custom program via said submersible device according to the user-selected program,
    wherein said submersible device is responsive to control signals received from said programmable control unit to execute the user-selected custom program of one or more sets of digitally prerecorded sounds in a specified sequence and at a specified volume in response to control signals received from said programmable device.

5. The system as claimed in claim 4, wherein the user-selected custom program includes the volume of playback of the one or more sets of digitally prerecorded sounds.

6. The system as claimed in claim 4, wherein the user-selected custom program includes signals for sweeping volume of playback within a selected range of volume levels.

7. The system as claimed in claim 6, wherein the user-selected custom program further comprises a selected time interval between changes in said volume levels.

8. The system as claimed in claim 4, wherein said the user-selected custom program comprises a predetermined delay signal between the one or more sets of digitally prerecorded sounds.

9. The system as claimed in claim 4, wherein the user-selected custom program includes intermittent playback of said one or more of said one or more sets of digitally prerecorded sounds.

10. The system as claimed in claim 4, wherein said plurality of one or more sets of digitally prerecorded sounds comprise a sound of fish in distress.

11. The system as claimed in claim 4, wherein said plurality of one or more sets of digitally prerecorded sounds comprise a sound of prey being attacked and eaten underwater.

12. The system as claimed in claim 4, wherein said transducer element is positioned opposite from a second transducer element within said watertight housing.

13. A method for attracting and stimulating aquatic animals, said method comprising:
   providing an input device including a user interface comprising menu of a plurality of user-selectable options including a selection of a plurality of sets of digitally prerecorded sounds, sequence and volume;
   manually selecting from the user interface menu a custom program including one or more said sets of digitally prerecorded sounds in a specified sequence and at a specified volume;
   retrieving the one or more sets of digital sounds from a memory device which stores the plurality of sets of digital sounds, at least some of which relate to sounds associated with aquatic prey;
   executing the custom program by transmitting to an underwater transducer device, signals for playing the one or more sets of digitally prerecorded sounds in the preselected sequence and with the selected volume wherein the underwater transducer plays sounds representative of the one or more sets of the digitally prerecorded sounds at the specified sequence and at the specified volume.

14. The method as claimed in claim 13, wherein the menu of user selectable options includes the selection of a delay period between one or more sets of digitally prerecorded sounds; and further the custom program includes the selection of a predetermined delay period between the one or more sets of digitally prerecorded sounds.

15. The method as claimed in claim 14, wherein the selection act further comprising selecting an individual volume level for each set of said digitally prerecorded sounds in said specified sequence.

16. The method as claimed in claim 13, wherein the menu of user selectable options includes the selection of gradually increasing the volume level of the audible sounds up to a selected maximum volume level and the selection act further comprises selecting the increase of the volume level of the sounds.

17. The method as claimed in claim 16, wherein the menu of user selectable options includes the selection of an interval of time between increases in the volume level further comprising the step of selecting an interval of time between increases in the volume level for the custom program.

18. The method as claimed in claim 13, further comprising the step of recovering acoustical signals from said underwater transducer device.

19. The method as claimed in claim 18, further comprising the step of comparing one or more characteristics of said recovered acoustical signals to one or more characteristics of said plurality of digital sounds.

20. The method as claimed in claim 13, further comprising the step of recording acoustical signals received from said underwater transducer device.

21. The method as claimed in claim 19, further comprising the step of detecting a match between one of said acoustical signals and one of said digital sounds.

22. The method as claimed in claim 13, wherein said plurality of sets of digitally prerecorded sounds include a sound of aquatic animals feeding on crawfish.

23. The system as claimed in claim 4, wherein said plurality of sets of digital sounds comprises naturally occurring sounds.

24. The system as claimed in claim 4, wherein said plurality of sets of digitally prerecorded sounds further comprises synthesized sounds.

25. The system as claimed in claim 4, wherein said submersible device is coupled to a motor.

26. The system as claimed in claim 4 wherein the plurality of user-selectable options further comprises the duration of the or each set of digital sounds.

27. The system as claimed in claim 4 wherein the plurality of user-selectable options further comprises intermittency or delay between the playing each of the one or more sets of digitally prerecorded sounds.

28. The system as claimed in claim 4 wherein the plurality of user-selectable options further comprises a load function to load the user-selected custom program to the processor.

29. The system as claimed in claim 4 wherein the plurality of user-selectable options further comprises lock function to lock the user-selected custom program for execution by the processor.

30. The system as claimed in claim 4 wherein the plurality of user-selectable options further comprises a save function whereby the user-selected custom program can be saved to the memory device for future use.

31. The system as claimed in claim 4 wherein the submersible device further includes external elements that regulate depth control, orientation and attitude while trolling.

32. The system as claimed in claim 31 wherein the external elements include at least one of diving planes, rudders, and flotation devices.

33. The system as claimed in claim 1 and further comprising at least one underwater sensing device linked to the programmable device through the submersible device for detecting and analyzing one or more environmental conditions, including sounds, visual activity, temperature, geographic location.

34. The system as claimed in claim 33 wherein the at least one underwater sensing device is a video camera.

35. The system as claimed in claim 33 and further comprising a sonar device coupled to the submersible device.

36. The system as claimed in claim 33 wherein the at least one underwater sensing device is a sonic detector.

37. The system as claimed in claim 33 wherein the at least one underwater sensing device is a temperature gauge.

38. The system as claimed in claim 33 wherein the at least one underwater sensing device is a water clarity/turbidity meter.

39. The system as claimed in claim 33 wherein the at least one underwater sensing device is an oxygen meter.

40. The system as claimed in claim 33 wherein the at least one underwater sensing device is a pH meter.

41. The system as claimed in claim 33 wherein the at least one underwater sensing device is a trolling speed indicator.

42. The system as claimed in claim 33 wherein the at least one underwater sensing device is a video camera for visually monitoring the underwater environment, a light source and intensity meter, and wherein the programmable control unit is programmed to automatically trigger the playback of a particular digitally prerecorded sounds that is more effective during night-time fishing.

43. The system as claimed in claim 33 wherein the programmable device is responsive to the detected signals from the at least one underwater sensing device to identify specific fish, school of fish or other underwater objects or activities, and responsive thereto to initiate playback of one or more of the digitally prerecorded sounds that are known to attract the identified fish.

44. The system as claimed in claim 43 wherein the programmable device is responsive to the detected signals from the at least one underwater sensing device to locate and the approximate position of the identified specific fish or school of fish.

45. A system for attracting and stimulating aquatic animals, said system comprising:
   a submersible device comprising multiple transducer elements disposed within a watertight housing and adapted to play and record underwater sounds in multiple directions; and
   a portable programmable control unit operably linked to said submersible device, said programmable control unit comprising:
      a processor;
      a memory device, operably connected to said processor, for storing a plurality of sets of digitally prerecorded sounds, at least some of which relate to sounds associated with aquatic prey; and
      an input device operably connected to said processor for transmitting one or more of said plurality of sets of digitally prerecorded sounds to said submersible device for playback in said multiple directions under water:
   wherein said submersible device is responsive to control signals received from said programmable control unit to play one or more sets of digitally prerecorded sounds in response to control signals received from said programmable control unit.

46. The system for attracting and stimulating aquatic animals according to claim 45 wherein the multiple transducer devices are functional to detect underwater sounds and the processor is programmed to process the underwater sounds detected by the multiple transducer devices.

47. The system for attracting and stimulating aquatic animals according to claim 46 wherein the processor is programmed to process the detected underwater sounds to perform one or more of the functions of identifying the sound or vibration source, distance of sound source, direction of sound source, depth of sound source, and measuring the sound intensity.

48. The system for attracting and stimulating aquatic animals according to claim 47 wherein the processor is programmed to conduct acoustic spectra analysis on the detected sounds.

49. The system for attracting and stimulating aquatic animals according to claim 46 wherein the portable programmable control unit has switch operably linked to the processor to control the recording and detecting modes of the multiple transducer devices.

50. The system for attracting and stimulating aquatic animals according to claim 49 wherein the switch is controlled by a timer to automatically switch between the recording and detecting modes.

51. The system for attracting and stimulating aquatic animals according to claim 49 wherein the switch is controlled to automatically switch between the detecting and recording modes when the processor has identified sounds as relating to a particular aquatic animal.

52. The system for attracting and stimulating aquatic animals according to claim 51 wherein the processor is further programmed to play one or more of the plurality of sets of digitally prerecorded sounds that relate to attraction of the identified particular aquatic animal.

53. The system for attracting and stimulating aquatic animals according to claim 46 wherein at least some of the sets of digitally prerecorded sounds relate to aquatic animals and the processor is programmed to compare the detected signals for a match to the sounds of any of the digitally prerecorded sounds that relate to the aquatic animals and is further programmed to alert a user in the vicinity of the programmable control unit of the existence of an identified specie of an aquatic animal.

54. The system for attracting and stimulating aquatic animals according to claim 53 wherein the processor is further programmed to calculate the direction of the identified specie from the submersible device.

55. The system for attracting and stimulating aquatic animals according to claim 54 wherein processor is further programmed to calculate the precise location of the identified specie from the submersible device.

56. The system for attracting and stimulating aquatic animals according to claim 53 wherein processor is programmed with a number of different alert signals, each relating to given specie, event or condition and is programmed to match the alert to the user to the particular specie, event or condition.

57. The system for attracting and stimulating aquatic animals according to claim 47 wherein the processor is integrated with a GPS to determine the geographic location of the source of any detected sounds thus analyzed by the processor.

58. The system for attracting and stimulating aquatic animals according to claim 46 wherein the processor is programmed to identify the direction of a signal source by analyzing the intensity of a given sound from each of the multiple transducer devices.

59. The system for attracting and stimulating aquatic animals according to claim 46 wherein the processor is adapted to convert the detected sound signals into digital files of sonic signature identification data and the processor is programmed to compare the detected signals with a library of specific natural or artificial sounds in said memory device for determining a match between profile values of the detected sounds and the library of specific natural and artificial sounds.

* * * * *